United States Patent
H R et al.

(10) Patent No.: US 12,355,752 B2
(45) Date of Patent: Jul. 8, 2025

(54) ENABLING A BULK RELEASE OF MULTIPLE LOGINS FOR A SERVER DEVICE

(71) Applicant: Juniper Networks, Inc., Sunnyvale, CA (US)

(72) Inventors: Jayadev H R, Bangalore (IN); Kiran Kumar K, Bangalore (IN); Subramanya Sharma P K, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 297 days.

(21) Appl. No.: 18/126,207

(22) Filed: Mar. 24, 2023

(65) Prior Publication Data

US 2024/0323177 A1    Sep. 26, 2024

(51) Int. Cl.
*H04L 9/40* (2022.01)
*H04L 12/66* (2006.01)

(52) U.S. Cl.
CPC .......... *H04L 63/0815* (2013.01); *H04L 12/66* (2013.01)

(58) Field of Classification Search
CPC ............................. H04L 63/0815; H04L 12/66
See application file for complete search history.

(56) References Cited

U.S. PATENT DOCUMENTS

| | | | |
|---|---|---|---|
| 7,415,025 B1 * | 8/2008 | Venkataraman | H04L 12/5601 370/395.2 |
| 12,081,405 B1 * | 9/2024 | Cakulev | H04M 15/66 |
| 2010/0037085 A1 * | 2/2010 | Qiang | H04L 69/40 714/2 |
| 2011/0307570 A1 * | 12/2011 | Speks | H04L 41/30 709/208 |

(Continued)

FOREIGN PATENT DOCUMENTS

| | | |
|---|---|---|
| EP | 2332319 A2 | 6/2011 |
| WO | 2010015981 A2 | 2/2010 |

OTHER PUBLICATIONS

S. Gandhewar, "DHCP Relay Initiated Release draft-gandhewar-dhc-relay-initiated-release-01," dhc Working Group, Intended status: Standards Track, Juniper Networks, Inc., Oct. 1, 2015, 11 Pages.

(Continued)

*Primary Examiner* — Oleg Survillo
(74) *Attorney, Agent, or Firm* — Harrity & Harrity, LLP (57) ABSTRACT

A network device may receive, from endpoint devices, login requests for a server device and may establish logins with the server device based on the login requests. The network device may generate a discover message with a bulk release message indicating that the network device is capable of bulk release and including an identifier of the network device. The network device may include the address of the network device in the bulk release message based on the address of the network device not being shared across (Continued)

interfaces of the network device or may include a group identifier for the endpoint devices in the bulk release message based on the address of the network device being shared across the interfaces. The network device may provide the bulk release message to the server device based on determining that a restart of components of the network device is to occur.

20 Claims, 9 Drawing Sheets

(56) References Cited

U.S. PATENT DOCUMENTS

2022/0217814 A1* 7/2022 Dhammawat ....... H04L 41/0806
2024/0064863 A1* 2/2024 Dauneria ............. H04W 76/34

OTHER PUBLICATIONS

Extended European Search Report for Application No. EP23175762, mailed Nov. 6, 2023, 6 pages.
Gandhewar, S., "DHCPv6 Relay Initiated Release; draft-gandhewar-dhc-v6-relay-initiated-release-01.txt" dhc Working Group, Intended status: Standards Track, Juniper Networks, Inc., 2015, pp. 1-14.

* cited by examiner

ENABLING A BULK RELEASE OF MULTIPLE LOGINS FOR A SERVER DEVICE

BACKGROUND

The dynamic host configuration protocol (DHCP) is a network management protocol used on Internet protocol (IP) networks for automatically assigning IP addresses and other communication parameters to devices connected to the network using a client-server architecture.

SUMMARY

Some implementations described herein relate to a method. The method may include receiving, from a plurality of endpoint devices, a plurality of login requests for a server device and establishing a plurality of logins with the server device based on the plurality of login requests. The method may include generating a discover message with a bulk release message indicating that the network device is capable of bulk release and including an identifier of the network device in the bulk release message. The method may include determining whether an address of the network device is shared across interfaces of the network device with the plurality of endpoint devices. The method may include selectively including the address of the network device in the bulk release message based on the address of the network device not being shared across the interfaces of the network device, or including a group identifier for the plurality of endpoint devices in the bulk release message based on the address of the network device being shared across the interfaces of the network device. The method may include determining that a restart of one or more components of the network device is to occur and providing the bulk release message to the server device based on determining that the restart of the one or more components of the network device is to occur.

Some implementations described herein relate to a network device. The network device may include one or more memories and one or more processors. The one or more processors may be configured to receive, from a plurality of endpoint devices, a plurality of login requests for a server device and establish a plurality of logins with the server device based on the plurality of login requests. The one or more processors may be configured to include an identifier of the network device in a bulk release message indicating that the network device is capable of bulk release and determine whether an address of the network device is shared across interfaces of the network device with the plurality of endpoint devices. The one or more processors may be configured to selectively include the address of the network device in the bulk release message based on the address of the network device not being shared across the interfaces of the network device, or include a group identifier for the plurality of endpoint devices in the bulk release message based on the address of the network device being shared across the interfaces of the network device. The one or more processors may be configured to determine that a restart of one or more components of the network device is to occur and provide the bulk release message to the server device based on determining that the restart of the one or more components of the network device is to occur.

Some implementations described herein relate to a non-transitory computer-readable medium that stores a set of instructions. The set of instructions, when executed by one or more processors of a network device, may cause the network device to receive, from a plurality of endpoint devices, a plurality of login requests for a server device and establish a plurality of logins with the server device based on the plurality of login requests. The set of instructions, when executed by one or more processors of the network device, may cause the network device to generate a discover message with a bulk release message indicating that the network device is capable of bulk release and include an identifier of the network device in the bulk release message. The set of instructions, when executed by one or more processors of the network device, may cause the network device to selectively include the address of the network device in the bulk release message based on the address of the network device not being shared across interfaces of the network device, or include a group identifier for the plurality of endpoint devices in the bulk release message based on the address of the network device being shared across the interfaces of the network device. The set of instructions, when executed by one or more processors of the network device, may cause the network device to provide the bulk release message to the server device based on determining that a restart of one or more components of the network device is to occur and perform a single logout for the plurality of logins based on the bulk release message and based on the server device being capable of bulk release.

DETAILED DESCRIPTION

The following detailed description of example implementations refers to the accompanying drawings. The same reference numbers in different drawings may identify the same or similar elements.

Current client-server architectures for dynamic host configuration protocol (DHCP) provide a network device (e.g., a broadband network gateway or a DHCP relay) between endpoint devices (e.g., clients) and a server device (e.g., a DHCP server). For example, the network device may support a large quantity (e.g., thousands) of endpoint devices and may receive a large quantity (e.g., thousands) of corresponding login requests from the endpoint devices. The network device may establish a large quantity (e.g., thousands) of corresponding logins with the server device, based on the login requests, so that endpoint devices may communicate with the server device. When one or more components (e.g., line cards, flexible physical interface card (PIC) concentrators, and/or the like) of the network device restarts or power cycles, the network device may generate a large quantity (e.g., thousands) of logout release messages. The network device may attempt to provide the logout release messages to the server device, but the logout release messages may be dropped due to distributed denial of service (DDOS) prevention mechanisms, cyber-physical systems (CPS) attack prevention mechanisms, and/or the like.

Thus, current techniques for providing client-server architectures for DHCP consume computing resources (e.g., processing resources, memory resources, communication resources, and/or the like), networking resources, and/or the like, associated with expending hardware processing resources of a network device caused by generating the large quantity of logout release messages, losing the large quantity of logout release messages due to DDOS prevention mechanisms or CPS attack mechanisms, failing to release resources of the server device due to losing the large quantity of logout release messages, and/or the like.

Some implementations described herein relate to a network device that enables a bulk release of multiple logins for a server device. For example, a network device may receive, from a plurality of endpoint devices, a plurality of login requests for a server device and may establish a plurality of logins with the server device based on the plurality of login requests. The network device may generate a discover message with a bulk release message indicating that the network device is capable of bulk release and may include an identifier of the network device in the bulk release message. The network device may selectively include the address of the network device in the bulk release message based on the address of the network device not being shared across interfaces of the network device, or may include a group identifier for the plurality of endpoint devices in the bulk release message based on the address of the network device being shared across the interfaces of the network device. The network device may provide the bulk release message to the server device based on determining that a restart of one or more components of the network device is to occur and may perform a single logout for the plurality of logins based on the bulk release message and based on the server device being capable of bulk release.

In this way, the network device enables a bulk release of multiple logins for a server device. For example, by enabling the bulk release of multiple logins for the server device, the network device may reduce a quantity of logout release messages (e.g., DHCP logout release messages) from being flooded in a network. The network device may utilize an address and an identifier of the network device, or a group identifier for endpoint devices and the identifier of the network device, to enable a bulk release of multiple logins by the endpoint devices with the server device (e.g., instead of utilizing individual identifiers of the endpoint devices). Thus, the network device conserves computing resources, networking resources, and/or the like that would otherwise have been consumed by expending hardware processing resources of a network device caused by generating the large quantity of logout release messages, losing the large quantity of logout release messages due to DDOS prevention mechanisms or CPS attack mechanisms, failing to release resources of the server device due to losing the large quantity of logout release messages, and/or the like.

FIGS. 1A-1E are diagrams of an example 100 associated with enabling a bulk release of multiple logins for a server device. As shown in FIGS. 1A-1E, example 100 includes a plurality of endpoint devices, a server device, and a network with a plurality of network devices. In some implementations, the endpoint devices may correspond to DHCP clients, the network device may correspond to a DHCP relay (e.g., a broadband network gateway), and the server device may correspond to a DHCP server. Further details of the endpoint devices, the server device, the network, and the network devices are provided elsewhere herein.

Figure 1A:
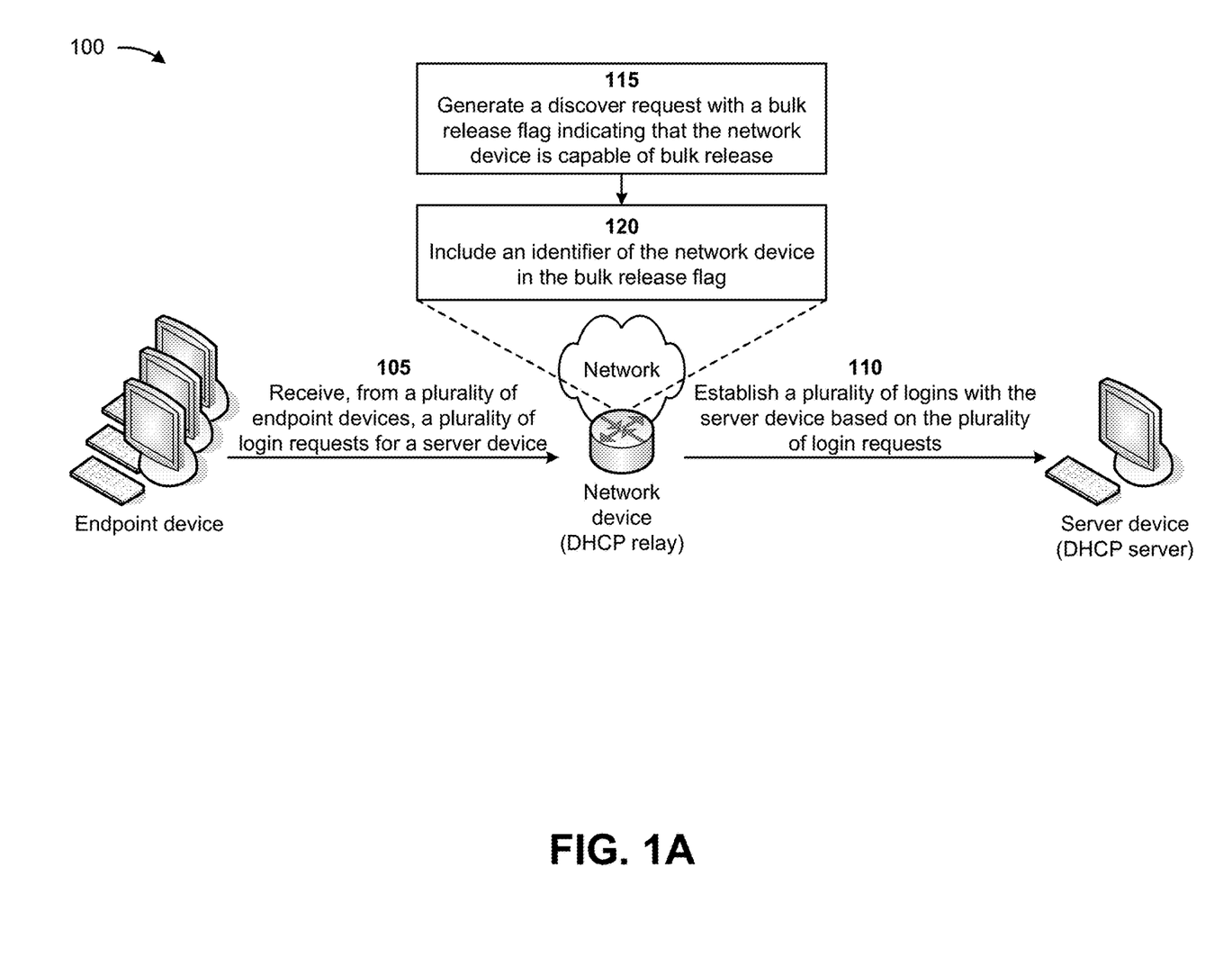
FIGS. 1A-1E are diagrams of an example associated with enabling a bulk release of multiple logins for a server device.

As shown in FIG. 1A, and by reference number 105, a network device may receive, from the plurality of endpoint devices, a plurality of login requests for the server device. For example, users of the plurality of endpoint devices may wish to communicate with the server device to receive one or more services from the server device, via the plurality of endpoint devices. In order to access the one or more services of the server device, the plurality of endpoint devices may generate the plurality of login requests for logging into the server device. The plurality of endpoint devices may provide the plurality of login requests to the network and the network device may receive the plurality of login requests from the plurality of endpoint devices. In some implementations, each of plurality of login requests may include an identifier of the server device, a request to log into the server device, an identifier of a service requested by an endpoint device, and/or the like. In some implementations, each of the plurality of login requests is a DHCP discover, offer, request, and acknowledge (DORA) request.

As further shown in FIG. 1A, and by reference number 110, the network device may establish a plurality of logins with the server device based on the plurality of login requests. For example, the network device may provide the plurality of login requests to the server device and the network device and server device may establish the plurality of logins based on the plurality of login requests. In some implementations, the server device may receive the plurality of login requests and may approve the plurality of login requests to establish a plurality of logins between the plurality of endpoint devices and the server device. The plurality of logins may enable the plurality of endpoint devices to communicate with and receive one or more services from the server device, via the network (e.g., the network device).

As further shown in FIG. 1A, and by reference number 115, the network device may generate a discover message with a bulk release flag (e.g., message) indicating that the network device is capable of bulk release. For example, the network device may generate a discover message (e.g., an initial boot request message) with a bulk release message indicating that the network device is capable of bulk release of the plurality of logins with the server device. In some implementations, the bulk release message may be a bulk release flag. In some implementations, the bulk release message may include a relay agent information option (e.g., referred to as "option 82") that includes a first sub-option indicating that the network device is capable of bulk release (e.g., and that the server device is capable of handling bulk release) and a second sub-option identifying an identifier of the network device and an address of the network device or identifying the identifier of the network device and a group identifier for the plurality of endpoint devices. In some implementations, when generating the bulk release message, the network device may generate the bulk release message based on receiving the plurality of login requests for the server device.

As further shown in FIG. 1A, and by reference number 120, the network device may include an identifier of the network device in the bulk release flag. For example, the network device may include the identifier of the network device in the second sub-option of the relay agent information option (e.g., the bulk release flag). In some implementations, the identifier of the network device may include a unique identifier of the network device, such as a serial number of the network device, a unique numeric or alphanumeric code of the network device, a model of the network device, and/or the like.

Figure 1B:
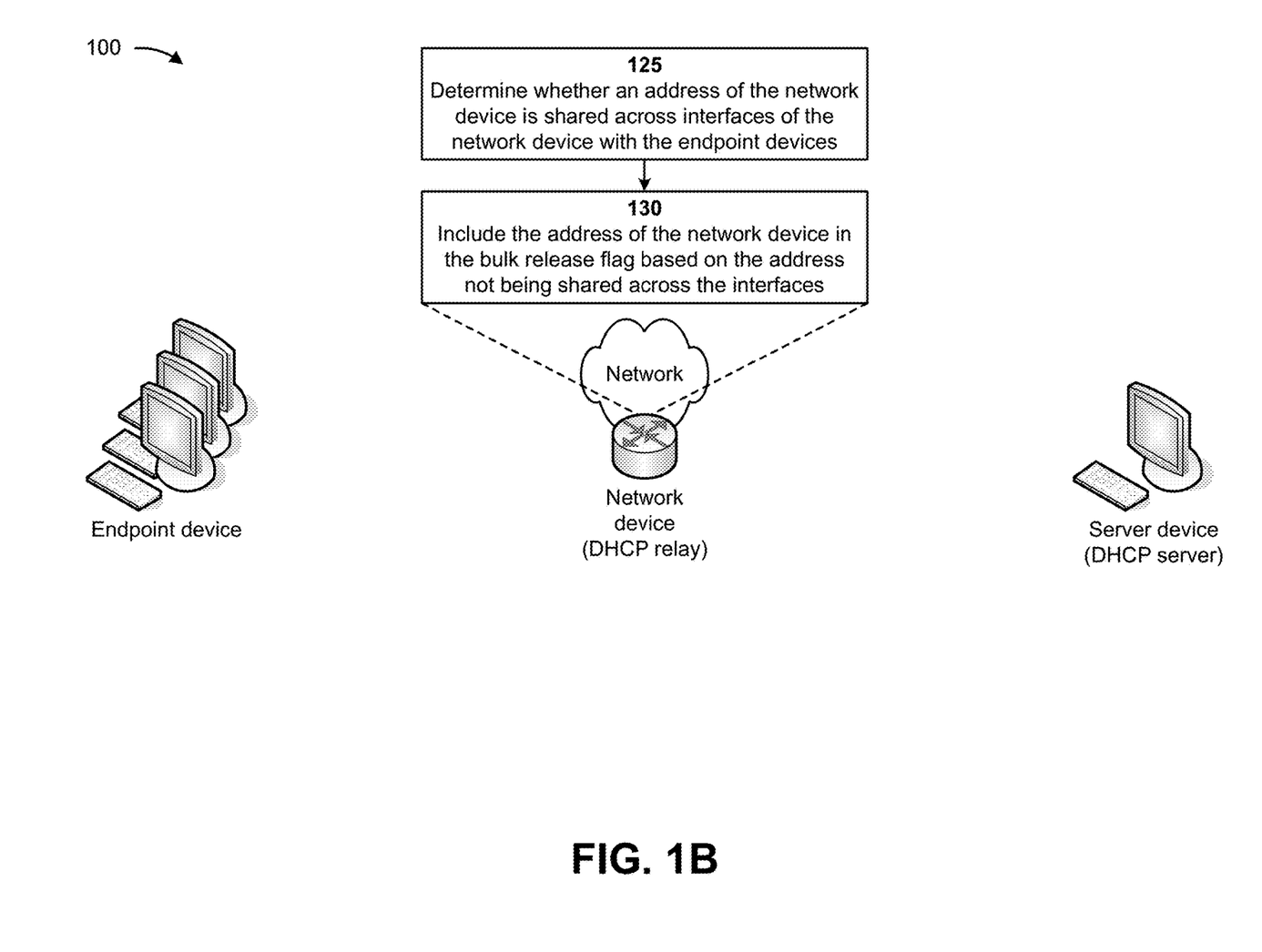

As shown in FIG. 1B, and by reference number 125, the network device may determine whether an address of the network device is shared across interfaces of the network device with the endpoint devices. For example, the network device may include multiple interfaces that communicate with the plurality of endpoint devices. The network device may determine whether the address of the network device is shared across two or more interfaces of the network device with the plurality of endpoint devices. In some implementations, the address of the network device may include a gateway Internet protocol (IP) address of the network device. In some implementations, the network device may determine that the address of the network device is shared across the interfaces of the network device with the plurality of endpoint devices. Alternatively, the network device may determine that the address of the network device is not shared across the interfaces of the network device with the plurality of endpoint devices.

As further shown in FIG. 1B, and by reference number 130, the network device may include the address of the network device in the bulk release flag based on the address not being shared across the interfaces. For example, when the network device determines that the address of the network device is not shared across the interfaces of the network device with the plurality of endpoint devices, the network device may include the address of the network device in the bulk release flag. In some implementations, the network device may include the address of the network device in the second sub-option of the relay agent information option (e.g., the bulk release flag).

Figure 1C:
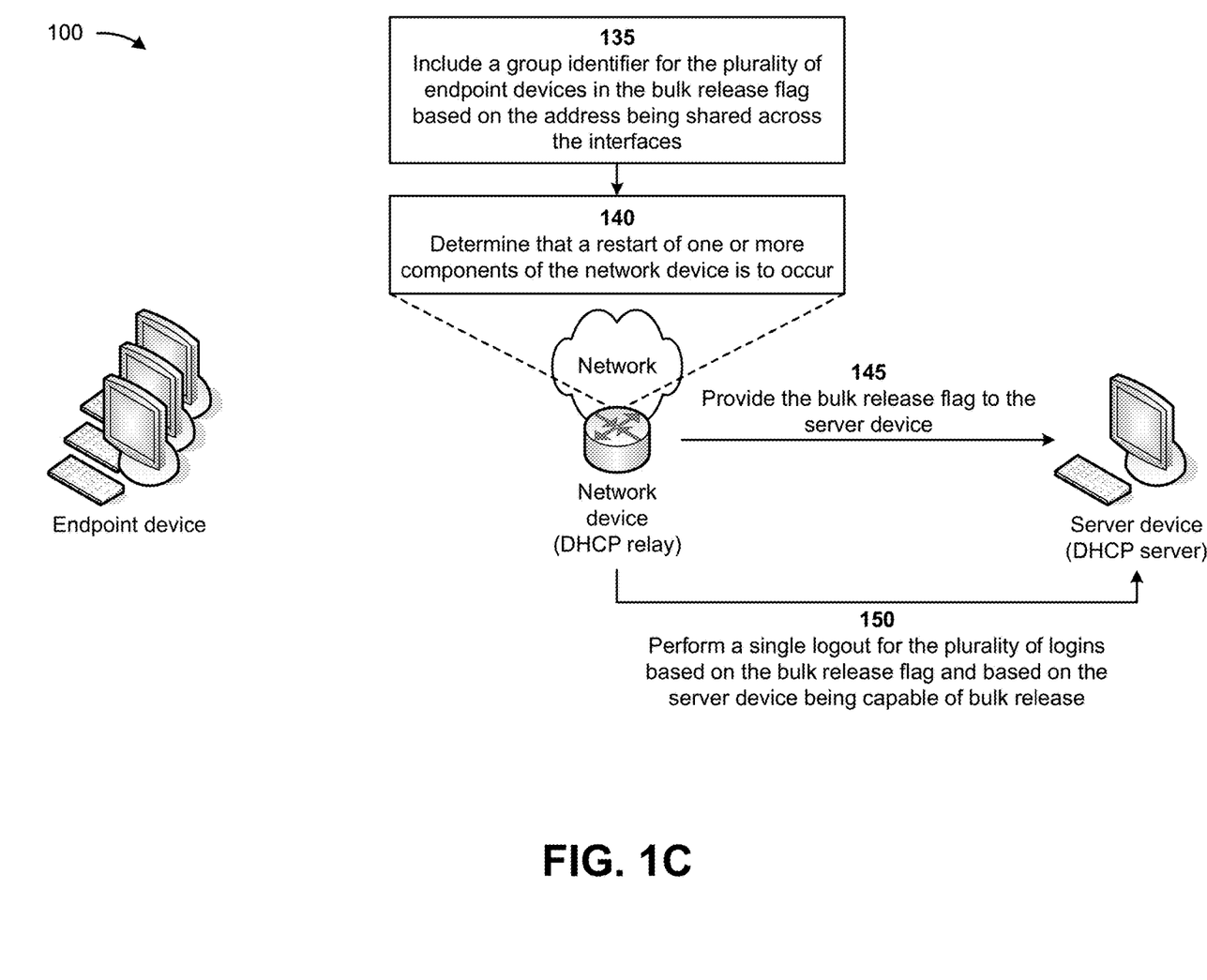

As shown in FIG. 1C, and by reference number 135, the network device may include a group identifier for the plurality of endpoint devices in the bulk release flag based on the address being shared across the interfaces. For example, when the network device determines that the address of the network device is shared across the interfaces of the network device with the plurality of endpoint devices, the network device may include the group identifier for the plurality of endpoint devices in the bulk release flag. In some implementations, the network device may include the group identifier for the plurality of endpoint devices in the second sub-option of the relay agent information option (e.g., the bulk release flag). In some implementations, the group identifier for the plurality of endpoint devices may include a secure gateway redundancy protocol (SGRP) identifier.

As further shown in FIG. 1C, and by reference number 140, the network device may determine that a restart of one or more components of the network device is to occur. For example, the network device may determine whether a restart (or power cycle) of one or more components of the network device is to occur. In some implementations, the one or more components of the network device may be scheduled to periodically restart (or power cycle) after a predetermined time period, may be scheduled to restart based on a command received by the network device, and/or the like. In such implementations, the network device may determine that the restart of one or more components of the network device is to occur based on the schedule, receipt of the command, and/or the like. In some implementations, the one or more components of the network device may include one or more line cards of the network device, one or more flexible PIC concentrators of the network device, and/or the like.

As further shown in FIG. 1C, and by reference number 145, the network device may provide the bulk release flag to the server device. For example, the network device may attempt to perform a bulk release based on determining that the restart of the one or more components of the network device is to occur. In some implementations, the network device may provide the bulk release flag to the server device based on determining that the restart of the one or more components of the network device is to occur. The server device may receive the bulk release flag from the network device.

As further shown in FIG. 1C, and by reference number 150, the network device may perform a single logout for the plurality of logins based on the bulk release flag and based on the server device being capable of bulk release. For example, the server device may provide, to the network device, a bulk release flag response indicating that the server device is capable of bulk release. In some implementations, the network device may perform a single logout for the plurality of logins based on the bulk release flag and based on the server device being capable of bulk release. In some implementations, the single logout may cause the server device to release the plurality of endpoint devices associated with the identifier of the network device and the address of the network device when the identifier and the address of the network device are provided via the bulk release flag to the server device. Alternatively, the single logout may cause the server device to release the plurality of endpoint devices associated with the identifier of the network device and the group identifier for the plurality of endpoint devices when the identifier of the network device and the group identifier are provided via the bulk release flag to the server device.

Figure 1D:
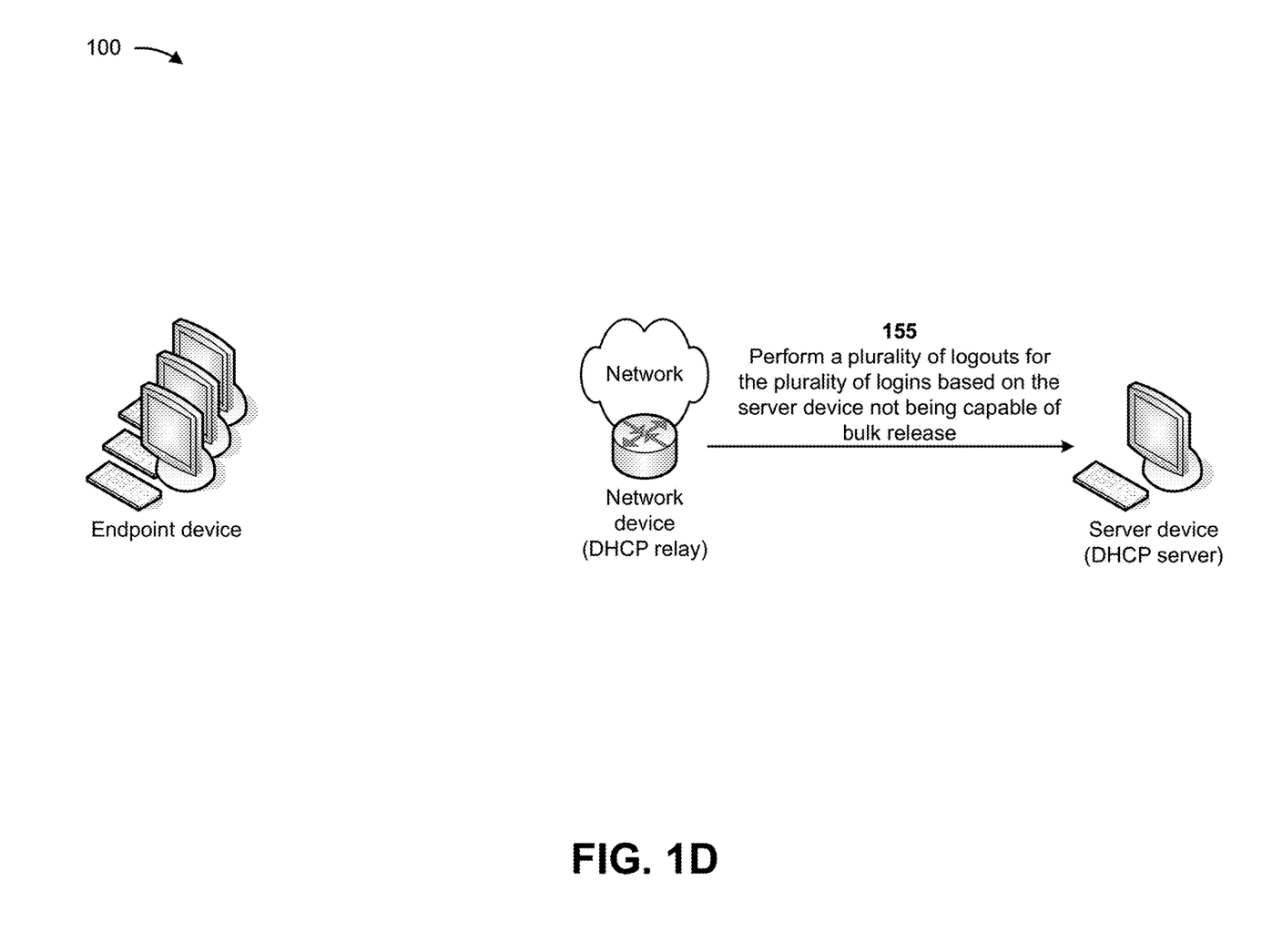

As shown in FIG. 1D, and by reference number 155, the network device may perform a plurality of logouts for the plurality of logins based on the server device not being capable of bulk release. For example, the server device may provide, to the network device, a bulk release flag response indicating that the server device is not capable of bulk release. In some implementations, the network device may perform a plurality of logouts for the plurality of logins when the server device is not capable of bulk release. In such implementations, the network device may utilize addresses of the plurality of endpoint devices to perform the plurality of logouts for the plurality of logins.

Figure 1E:
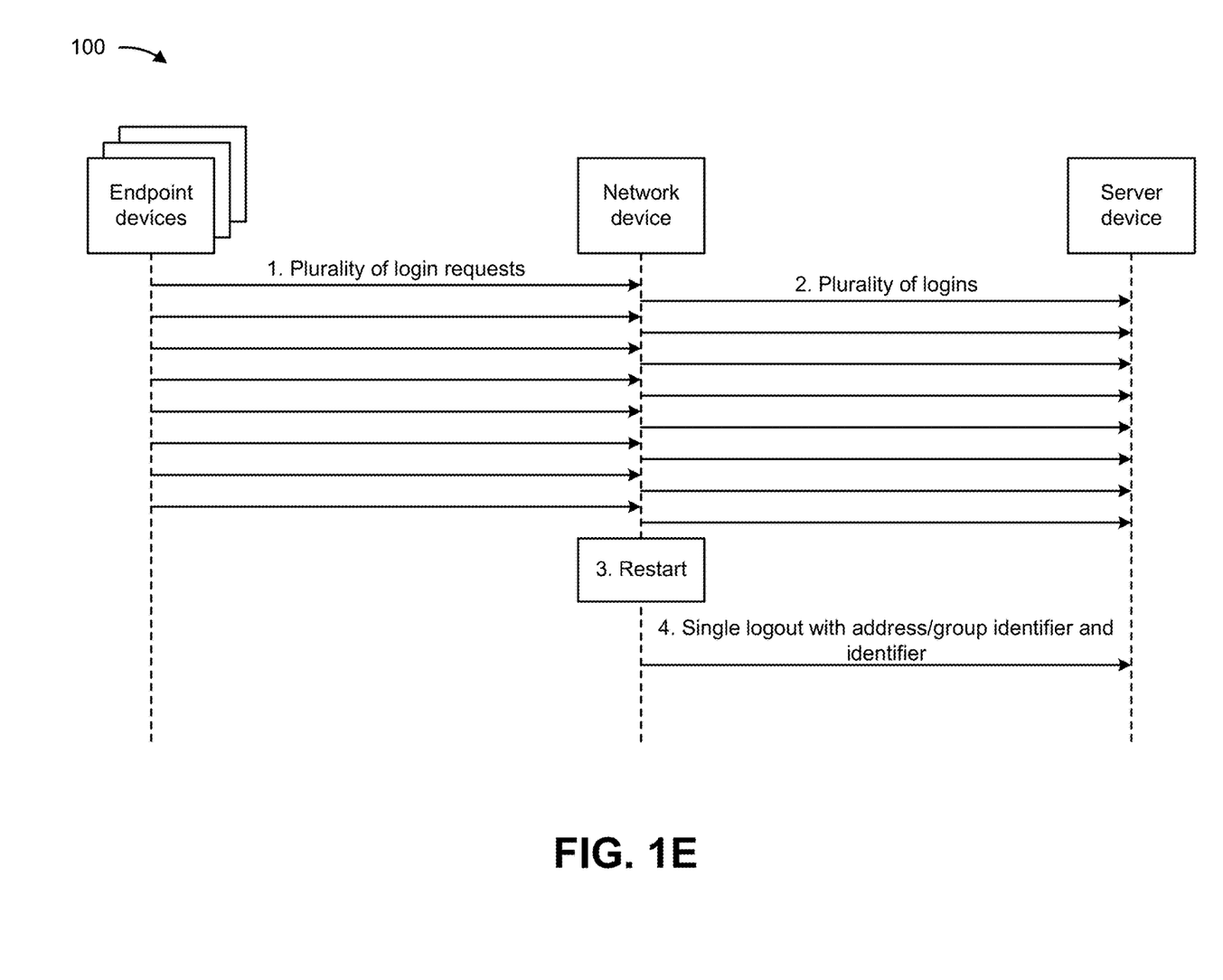

FIG. 1E is a call flow diagram describing interactions between the plurality of endpoint devices, the network device, and the server device. As shown at step 1 of FIG. 1E, the plurality of endpoint devices may generate a plurality of login requests and may provide the plurality of login requests to the network device. The network device may receive the plurality of login requests. As shown at step 2, the network device may establish a plurality of logins with the server device based on the plurality of login requests. As shown at step 3, the network device may determine that a restart of one or more components of the network device is to occur. As shown at step 4, the network device may perform a single logout for the plurality of logins based on the bulk release flag (e.g., the address and the identifier of the network device or the group identifier and the identifier of the network device) and based on the server device being capable of bulk release.

In this way, the network device enables a bulk release of multiple logins for a server device. For example, by enabling the bulk release of multiple logins for the server device, the network device may reduce a quantity of logout release messages (e.g., DHCP logout release messages) from being flooded in a network. The network device may utilize an address and an identifier of the network device, or a group identifier for endpoint devices and the identifier of the network device, to enable a bulk release of multiple logins by the endpoint devices with the server device (e.g., instead of utilizing individual identifiers of the endpoint devices). Thus, the network device conserves computing resources, networking resources, and/or the like that would otherwise have been consumed by expending hardware processing resources of a network device caused by generating the large quantity of logout release messages, losing the large quantity of logout release messages due to DDOS prevention mechanisms or CPS attack mechanisms, failing to release resources of the server device due to losing the large quantity of logout release messages, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
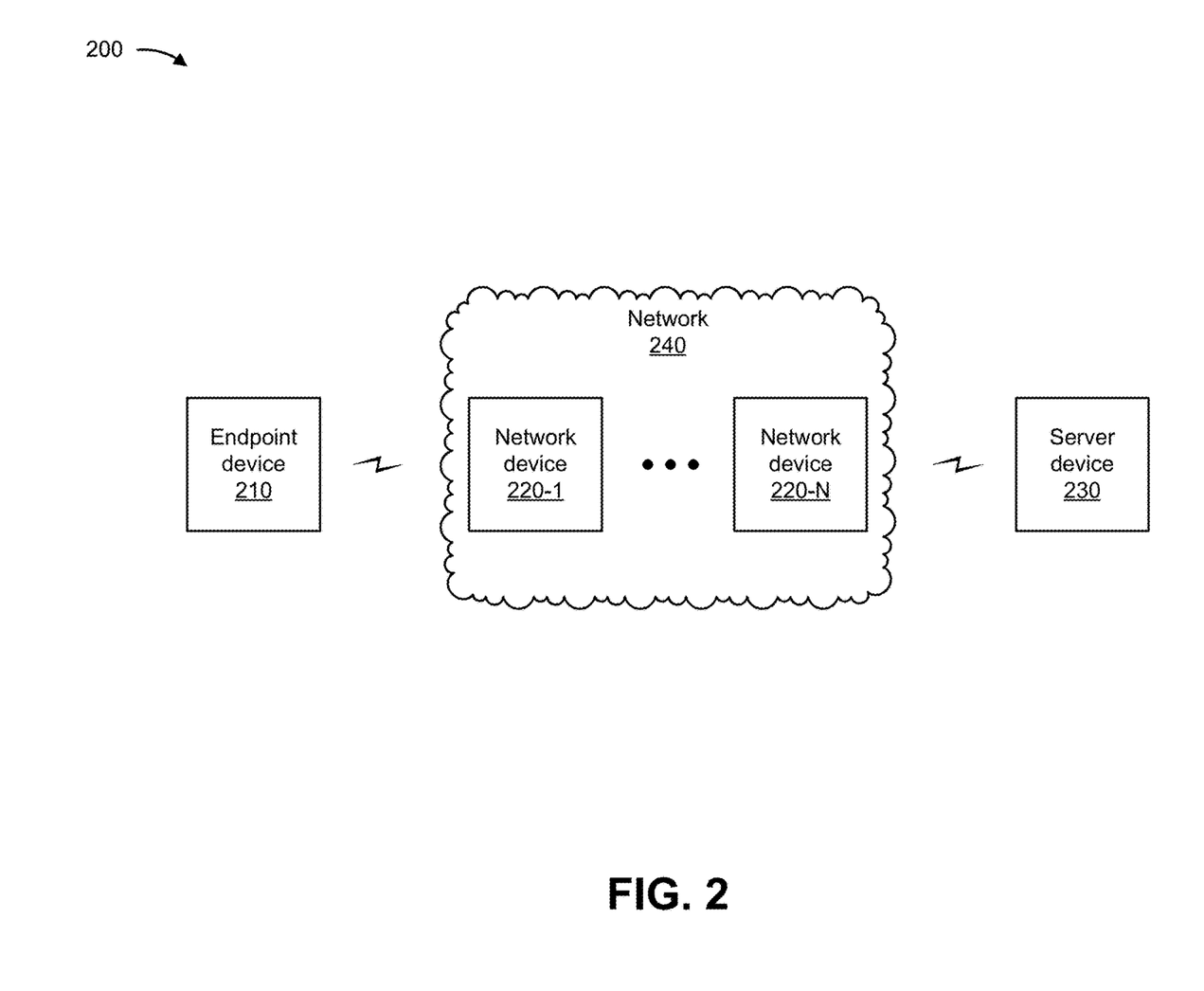
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include endpoint devices 210, a group of network devices 220 (shown as network device 220-1 through network device 220-N), a server device 230, and a network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a set-top box, a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device (e.g., a router, a residential gateway, and/or the like), or a similar type of device. In some implementations, the endpoint device 210 may receive network traffic from and/or may provide network traffic to the server device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 may include one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, and/or a third generation (3G) network), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
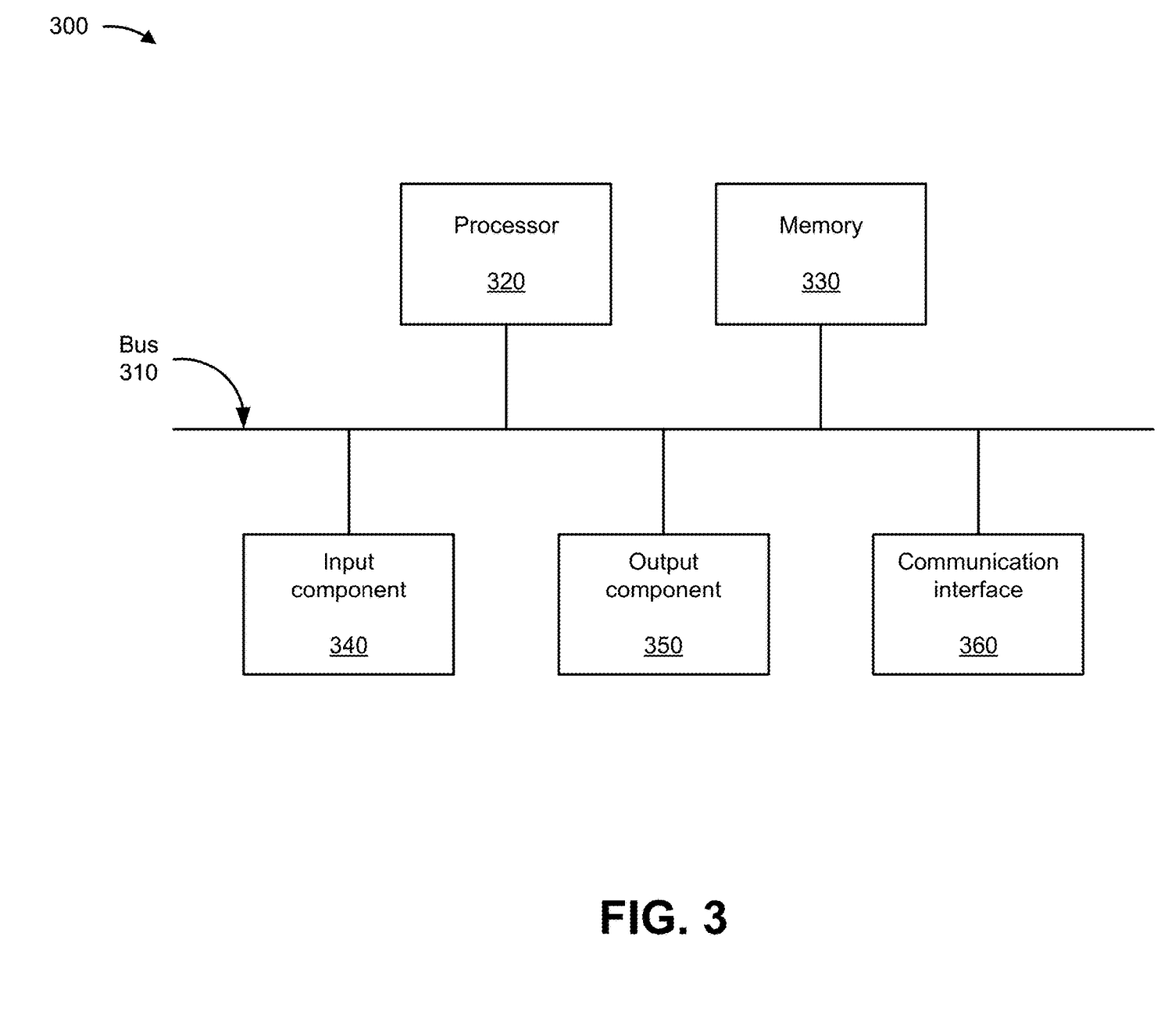
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, and/or the server device 230. In some implementations, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
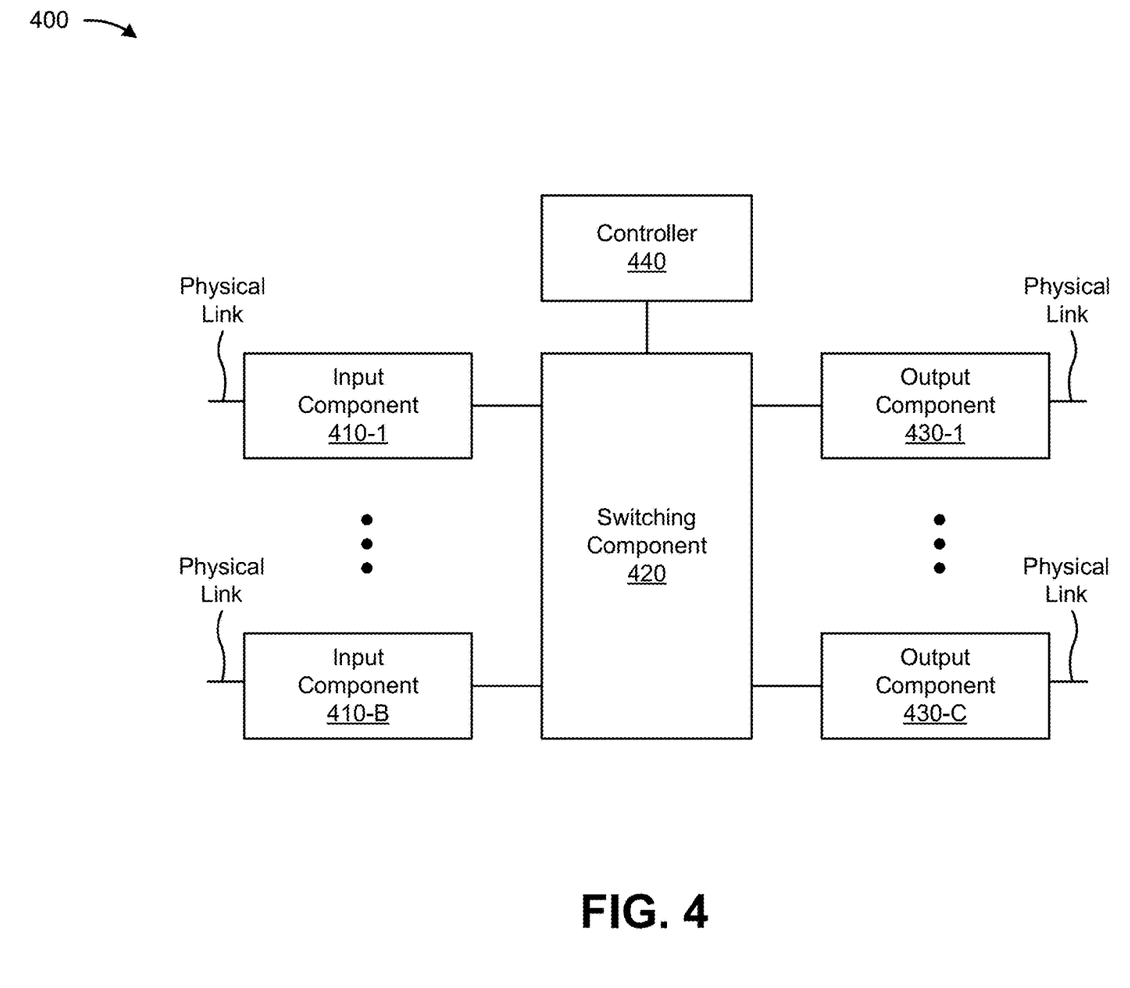

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices. Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
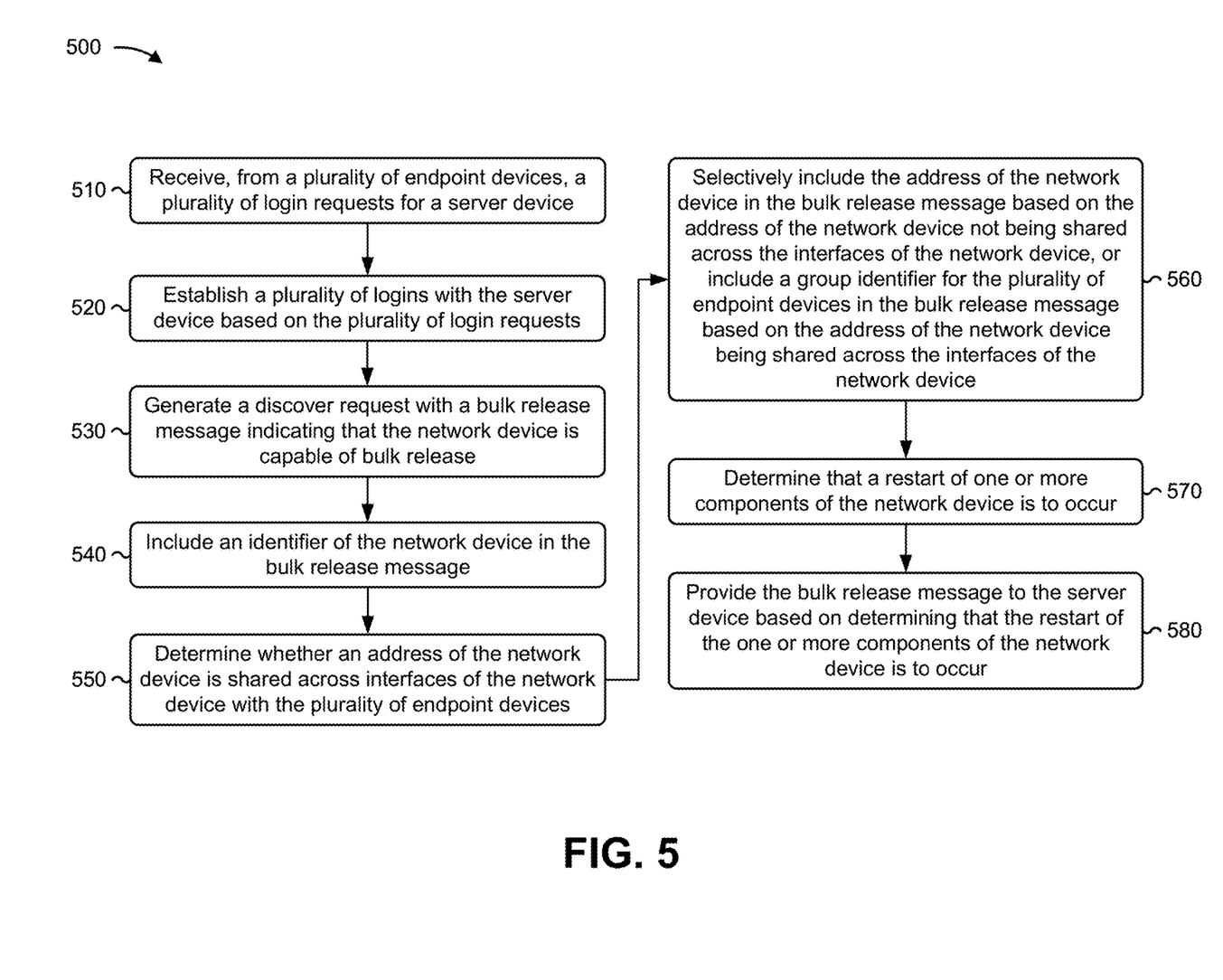
FIG. 5 is a flowchart of an example process for enabling a bulk release of multiple logins for a server device.

FIG. 5 is a flowchart of an example process 500 for enabling a bulk release of multiple logins for a server device. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210) and/or a server device (e.g., the server device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving, from a plurality of endpoint devices, a plurality of login requests for a server device (block 510). For example, the network device may receive, from a plurality of endpoint devices, a plurality of login requests for a server device, as described above. In some implementations, each of the plurality of login requests is a DHCP DORA request. In some implementations, the network device is a broadband network gateway. In some implementations, the network device is a DHCP relay and the server device is a DHCP server.

As further shown in FIG. 5, process 500 may include establishing a plurality of logins with the server device based on the plurality of login requests (block 520). For example, the network device may establish a plurality of logins with the server device based on the plurality of login requests, as described above.

As further shown in FIG. 5, process 500 may include generating a discover message with a bulk release message indicating that the network device is capable of bulk release (block 530). For example, the network device may generate a bulk release message indicating that the network device is capable of bulk release, as described above. In some implementations, the bulk release message is a bulk release flag. In some implementations, the bulk release message is a relay agent information option that includes a first sub-option indicating that the network device is capable of bulk release and a second sub-option identifying the identifier of the network device and the address of the network device or identifying the identifier of the network device and the group identifier for the plurality of endpoint devices. In some implementations, generating the bulk release message includes generating the bulk release message based on receiving the plurality of login requests for the server device.

As further shown in FIG. 5, process 500 may include including an identifier of the network device in the bulk release message (block 540). For example, the network device may include an identifier of the network device in the bulk release message, as described above.

As further shown in FIG. 5, process 500 may include determining whether an address of the network device is shared across interfaces of the network device with the plurality of endpoint devices (block 550). For example, the network device may determine whether an address of the network device is shared across interfaces of the network device with the plurality of endpoint devices, as described above. In some implementations, the address of the network device is a gateway IP address of the network device.

As further shown in FIG. 5, process 500 may include selectively including the address of the network device in the bulk release message based on the address of the network device not being shared across the interfaces of the network device, or including a group identifier for the plurality of endpoint devices in the bulk release message based on the address of the network device being shared across the interfaces of the network device (block 560). For example, the network device may selectively include the address of the network device in the bulk release message based on the address of the network device not being shared across the interfaces of the network device, or include a group identifier for the plurality of endpoint devices in the bulk release message based on the address of the network device being shared across the interfaces of the network device, as described above. In some implementations, the group identifier for the plurality of endpoint devices is an SGRP identifier.

As further shown in FIG. 5, process 500 may include determining that a restart of one or more components of the network device is to occur (block 570). For example, the network device may determine that a restart of one or more components of the network device is to occur, as described above. In some implementations, the one or more components of the network device include one or more of a line card of the network device or a flexible PIC concentrator of the network device.

As further shown in FIG. 5, process 500 may include providing the bulk release message to the server device based on determining that the restart of the one or more components of the network device is to occur (block 580). For example, the network device may provide the bulk release message to the server device based on determining that the restart of the one or more components of the network device is to occur, as described above.

In some implementations, process 500 includes performing a single logout for the plurality of logins based on the bulk release message and based on the server device being capable of bulk release. In some implementations, the single logout causes the server device to release the plurality of endpoint devices associated with the identifier of the network device and the address of the network device, or to release the plurality of endpoint devices associated with the identifier of the network device and the group identifier for the plurality of endpoint devices. In some implementations, process 500 includes performing a plurality of logouts for the plurality of logins based on the server device not being capable of bulk release.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a network device and from a plurality of endpoint devices, a plurality of login requests for a server device;
    establishing, by the network device, a plurality of logins with the server device based on the plurality of login requests;
    generating, by the network device, a discover message with a bulk release message indicating that the network device is capable of bulk release;
    including, by the network device, an identifier of the network device in the bulk release message;
    determining, by the network device, whether an address of the network device is shared across interfaces of the network device with the plurality of endpoint devices;
    selectively:
        including, by the network device, the address of the network device in the bulk release message based on the address of the network device not being shared across the interfaces of the network device; or
        including, by the network device, a group identifier for the plurality of endpoint devices in the bulk release message based on the address of the network device being shared across the interfaces of the network device;
    determining, by the network device, that a restart of one or more components of the network device is to occur; and
    providing, by the network device, the bulk release message to the server device based on determining that the restart of the one or more components of the network device is to occur.

2. The method of claim 1, further comprising:
    performing a single logout for the plurality of logins based on the bulk release message and based on the server device being capable of bulk release.

3. The method of claim 2, wherein the single logout causes the server device to release the plurality of endpoint devices associated with the identifier of the network device and the address of the network device, or to release the plurality of endpoint devices associated with the identifier of the network device and the group identifier for the plurality of endpoint devices.

4. The method of claim 1, further comprising:
    performing a plurality of logouts for the plurality of logins based on the server device not being capable of bulk release.

5. The method of claim 1, wherein each of the plurality of login requests is a dynamic host configuration protocol discover, offer, request, and acknowledge request.

6. The method of claim 1, wherein the address of the network device is a gateway Internet protocol address of the network device.

7. The method of claim 1, wherein the group identifier for the plurality of endpoint devices is a secure gateway redundancy protocol identifier.

8. A network device, comprising:
one or more memories; and
one or more processors to:
receive, from a plurality of endpoint devices, a plurality of login requests for a server device;
establish a plurality of logins with the server device based on the plurality of login requests;
include an identifier of the network device in a bulk release message indicating that the network device is capable of bulk release;
determine whether an address of the network device is shared across interfaces of the network device with the plurality of endpoint devices;
selectively:
include the address of the network device in the bulk release message based on the address of the network device not being shared across the interfaces of the network device; or
include a group identifier for the plurality of endpoint devices in the bulk release message based on the address of the network device being shared across the interfaces of the network device;
determine that a restart of one or more components of the network device is to occur; and
provide the bulk release message to the server device based on determining that the restart of the one or more components of the network device is to occur.

9. The network device of claim 8, wherein the bulk release message is a bulk release flag.

10. The network device of claim 8, wherein the bulk release message is a relay agent information option that includes a first sub-option indicating that the network device is capable of bulk release and a second sub-option identifying the identifier of the network device and the address of the network device or identifying the identifier of the network device and the group identifier for the plurality of endpoint devices.

11. The network device of claim 8, wherein the one or more components of the network device include one or more of a line card of the network device or a flexible physical interface card concentrator of the network device.

12. The network device of claim 8, wherein the network device is a broadband network gateway.

13. The network device of claim 8, wherein the network device is a dynamic host configuration protocol (DHCP) relay and the server device is a DHCP server.

14. The network device of claim 8, wherein the one or more processors are further to:
generate the bulk release message based on receiving the plurality of login requests for the server device.

15. A non-transitory computer-readable medium storing a set of instructions, the set of instructions comprising:
one or more instructions that, when executed by one or more processors of a network device, cause the network device to:
receive, from a plurality of endpoint devices, a plurality of login requests for a server device;
establish a plurality of logins with the server device based on the plurality of login requests;
generate a discover message with a bulk release message indicating that the network device is capable of bulk release;
include an identifier of the network device in the bulk release message;
selectively:
include an address of the network device in the bulk release message based on the address of the network device not being shared across interfaces of the network device; or
include a group identifier for the plurality of endpoint devices in the bulk release message based on the address of the network device being shared across the interfaces of the network device;
provide the bulk release message to the server device based on determining that a restart of one or more components of the network device is to occur; and
perform a single logout for the plurality of logins based on the bulk release message and based on the server device being capable of bulk release.

16. The non-transitory computer-readable medium of claim 15, wherein the single logout causes the server device to release the plurality of endpoint devices associated with the identifier of the network device and the address of the network device or to release the plurality of endpoint devices associated with the identifier of the network device and the group identifier for the plurality of endpoint devices.

17. The non-transitory computer-readable medium of claim 15, wherein each of the plurality of login requests is a dynamic host configuration protocol discover, offer, request, and acknowledge request.

18. The non-transitory computer-readable medium of claim 15, wherein the bulk release message is a relay agent information option that includes a first sub-option indicating that the network device is capable of bulk release and a second sub-option identifying the identifier of the network device and the address of the network device or identifying the identifier of the network device and the group identifier for the plurality of endpoint devices.

19. The non-transitory computer-readable medium of claim 15, wherein the network device is a dynamic host configuration protocol (DHCP) relay and the server device is a DHCP server.

20. The non-transitory computer-readable medium of claim 15, wherein the one or more instructions, that cause the network device to generate the bulk release message, cause the network device to:
generate the bulk release message based on receiving the plurality of login requests for the server device.

* * * * *